(12) United States Patent
Shi (10) Patent No.: US 9,490,645 B2
(45) Date of Patent: Nov. 8, 2016

(54) BATTERY BALANCING CIRCUIT, SYSTEM AND METHOD

(71) Applicant: Dongguan PowerWise Technology Co., Ltd., Dongguan, Guangdong (CN)

(72) Inventor: Daming Shi, Dongguan (CN)

(73) Assignee: DONGGUAN POWERWISE TECHNOLOGY CO. (CN)

( * ) Notice: Subject to any disclaimer, the term of this patent is extended or adjusted under 35 U.S.C. 154(b) by 285 days.

(21) Appl. No.: 14/261,426

(22) Filed: Apr. 25, 2014

(65) Prior Publication Data

US 2015/0214766 A1  Jul. 30, 2015

(30) Foreign Application Priority Data

Jan. 24, 2014 (CN) .......................... 2014 1 0035741

(51) Int. Cl.
*H02J 7/00* (2006.01)

(52) U.S. Cl.
CPC ............ *H02J 7/0054* (2013.01); *H02J 7/0019* (2013.01); *H02J 7/0018* (2013.01)

(58) Field of Classification Search
CPC ..... H02J 7/0054; H02J 7/0019; H02J 7/0018
USPC ......................................................... 320/103
See application file for complete search history.

(56) References Cited

U.S. PATENT DOCUMENTS

| | | | |
|---|---|---|---|
| 2010/0244781 A1* | 9/2010 | Kramer ................. | H02J 7/0016 320/162 |
| 2011/0241622 A1* | 10/2011 | Li ......................... | H01M 10/42 320/116 |
| 2014/0062388 A1* | 3/2014 | Kim ...................... | H02J 7/0019 320/107 |

* cited by examiner

*Primary Examiner* — Jack Chiang
*Assistant Examiner* — Brandon Bowers
(74) *Attorney, Agent, or Firm* — Wiersch IP Law (57) ABSTRACT

A battery balancing circuit, system and method are disclosed. The battery balancing circuit comprises a plurality of individual batteries, a plurality of first switches, a plurality of second switches, a first control element, a second control element and a transformer. By controlling the first switch and the second switch to be turned on and controlling the first control element and the second control element to be selectively turned on, when the energy in the individual battery is excessive, the excessive energy in the individual battery is transferred to the buffering battery pack; and when the energy in the individual battery is insufficient, the individual battery absorbs energy from the buffering battery pack. In this way, the balance among individual batteries in the battery pack is accomplished and the service life of the battery pack is prolonged.

17 Claims, 4 Drawing Sheets

BATTERY BALANCING CIRCUIT, SYSTEM AND METHOD

FIELD

The present disclosure relates to the technical field of batteries, and more particularly, to a battery balancing circuit, system and method.

BACKGROUND

Lithium ion batteries currently used in the fields of electrical energy storing stations and electromobiles are generally formed of a plurality of individual batteries having large capacities that are connected in series. Ideally, the individual batteries in a battery pack have the same operation voltage and the same actual capacity as each other. However, for an actual battery pack, it is difficult to ensure that all the individual batteries have the same operation voltage and the same actual capacity as each other even before shipment of the battery pack, and as the number of charging and discharging operations of the battery pack increases, the inconsistency among the individual batteries in the battery pack will become greater. The inconsistency among the individual batteries will compromise operational performances such as the charging efficiency and the discharging capability of the battery pack, and meanwhile, will shorten the service life of the battery pack.

To solve the aforesaid problem, a practice in the prior art is to decrease the inconsistency among the individual batteries in the battery pack by means of a parallel resistor balancing method. The parallel resistor balancing method is to connect a resistor balancing circuit in parallel with each of the individual batteries so that excessive energy is consumed by the resistor. Although this practice uses only a simple circuit structure, it can only balance a small current, the heat generation is significant and the heat dissipating cost is high; and meanwhile, the balance can only be performed at the end of a charging period, so the electricity amount that can be balanced is limited. Further, this method can only accomplish the balance among individual batteries managed by a single battery management control unit (BMU).

Another practice in the prior art is to decrease the inconsistency among the individual batteries in the battery pack by means of an inductor balancing method. The inductor balancing method is to use an inductor as an energy storing element to transfer electrical energy from the individual batteries. Also, this practice can only achieve the balance among adjacent individual batteries managed by a single BMU, and the balancing time is long.

Therefore, in the process of balancing among the individual batteries in the battery pack, the prior art practices can only achieve the balance among individual batteries managed by a single BMU but cannot achieve the balance among all the individual batteries of the whole battery pack.

SUMMARY

A primary technical problem to be solved by the present disclosure is to provide a battery balancing circuit, system and method which can achieve the balance among individual batteries in a battery pack.

To solve the aforesaid technical problem, a solution adopted by the present disclosure is as follows: a battery balancing circuit is provided, which comprises: a plurality of individual batteries connected in series to form a battery pack; a plurality of first switches and a plurality of second switches, wherein each of the individual batteries corresponds to one of the first switches paired with one of the second switches, and the first switch has a first terminal connected to a negative pole of the individual battery and the second switch has a first terminal connected to a positive pole of the individual battery; a first control element, having a first terminal adapted to receive a first control signal transmitted by a microcontroller so that the first control element is selectively turned on between a second terminal and a third terminal thereof under the control of the first control signal, and the second terminal of the first control element is connected with a second terminal of the first switch; a second control element, having a first terminal adapted to receive a second control signal transmitted by the microcontroller so that the second control element is selectively turned on between a second terminal and a third terminal thereof under the control of the second control signal; and a transformer, comprising a primary coil and a secondary coil, wherein a dotted terminal of the primary coil is connected with the second terminal of the second switch, an undotted terminal of the primary coil is connected with the third terminal of the first control element, a dotted terminal of the secondary coil is connected with the third terminal of the second control element, and an undotted terminal of the secondary coil and the second terminal of the second control element are adapted to receive energy from an external buffering battery pack for balancing energy of the individual batteries or transfer energy to the buffering battery pack.

The first control element is an N type metal oxide semiconductor (MOS) transistor, and the first terminal, the second terminal and the third terminal of the first control element are a gate, a source and a drain of the N type MOS transistor; and the second control element is an N type MOS transistor, and the first terminal, the second terminal and the third terminal of the second control element are a gate, a source and a drain of the N type MOS transistor.

A voltage of the buffering battery pack is a 12 V DC voltage.

The first control signal and the second control signal are pulse signals of which the duty cycles are adjustable.

The circuit further comprises a current sampling module, wherein the current sampling module is connected in series between the second terminal of the first control element and the second terminal of the first switch to acquire a balancing current from the battery balancing circuit and transfer the balancing current to the microcontroller so that the microcontroller adjusts the first control signal and the second control signal according to the balancing current.

To solve the aforesaid technical problem, another solution adopted by the present disclosure is as follows: a battery balancing system is provided, which comprises: a microcontroller, a plurality of battery management modules and a buffering battery pack, wherein the battery management modules each comprise an aforesaid battery balancing circuit, the microcontroller connects with the plurality of battery management modules respectively via a first bus, and the plurality of battery management modules connect with the buffering battery pack respectively via a second bus.

The first bus is a controller local area network (LAN) bus, and the second bus is a power source bus.

To solve the aforesaid technical problem, yet another solution adopted by the present disclosure is as follows: a battery balancing method based on the aforesaid battery balancing system is provided, which comprises: acquiring the capacity of each of the individual batteries in each of the battery management modules by the microcontroller via the first bus; comparing, by the microcontroller, the capacity of each of the individual batteries with the predetermined threshold respectively; if the capacity of the individual battery is higher than the predetermined threshold, then controlling, by the microcontroller, the battery balancing circuit to transfer the energy of the individual battery to the buffering batter pack via the second bus so that the capacity of the individual battery after the energy is transferred reaches the predetermined threshold; and if the capacity of the individual battery is lower than the predetermined threshold, then controlling, by the microcontroller, the battery balancing circuit to transfer energy of the buffering battery pack to the individual battery via the second bus so that the capacity of the individual battery which has obtained the energy reaches the predetermined threshold.

The step of controlling, by the microcontroller, the battery balancing circuit to transfer the energy of the individual battery to the buffering batter pack via the second bus is specifically implemented by: controlling, by the microcontroller, the first switch and the second switch corresponding to the individual battery to be turned on; controlling, by the microcontroller, the individual battery to be connected with the primary coil via the first control signal and, meanwhile, controlling the buffering battery pack to be disconnected from the secondary coil via the second control signal so that the energy of the individual battery is stored into a magnetic core of the transformer via the primary coil; and controlling, by the microcontroller, the individual battery to be disconnected from the primary coil via the first control signal and, meanwhile, controlling the buffering battery pack to be connected with the secondary coil via the second control signal so that the energy stored into the magnetic core is transferred to the buffering battery pack via the secondary coil and the second bus in sequence.

The step of controlling, by the microcontroller, the battery balancing circuit to transfer energy of the buffering battery pack to the individual battery via the second bus is specifically implemented by: controlling, by the microcontroller, the first switch and the second switch corresponding to the individual battery to be turned on; controlling, by the microcontroller, the buffering battery pack to be connected with the secondary coil via the second control signal and, meanwhile, controlling the individual battery to be disconnected from the primary coil via the first control signal so that the energy of the buffering battery pack is stored into the magnetic core of the transformer via the second bus and the secondary coil in sequence; and controlling, by the microcontroller, the buffering battery pack to be disconnected from the secondary coil via the second control signal and, meanwhile, controlling the individual battery to be connected with the primary coil via the first control signal so that the energy stored into the magnetic core is transferred to the individual battery via the primary coil.

The benefits of the present disclosure are as follows: as compared with the prior art, the battery balancing circuit, system and method of the present disclosure control the first control element and the second control element to be selectively turned on so that when the energy in the individual battery is excessive, the excessive energy is transferred to the buffering battery pack; and when the energy in the individual battery is insufficient, the individual battery absorbs energy from the buffering battery pack. In this way, the balance among individual batteries in the battery pack is accomplished with a relatively simple circuit and the service life of the battery pack is prolonged. Meanwhile, the present disclosure solves the problem that the prior art can only achieve the balance among individual batteries managed by a single battery management module but cannot achieve the balance among all the individual batteries of the whole battery pack.

BRIEF DESCRIPTION OF THE DRAWINGS

Hereinbelow, the present disclosure will be further described with reference to the attached drawings and the embodiments thereof, in which.

DETAILED DESCRIPTION

Hereinbelow, technical solutions of embodiments of the present disclosure will be described clearly and completely with reference to the attached drawings. Obviously, embodiments described herein are only some of but not all of the embodiments of the present disclosure. All other embodiments that can be obtained without making inventive efforts by those of ordinary skill in the art upon reviewing the disclosures of the embodiments of the present disclosure shall fall within the scope of the present disclosure.

Figure 1:
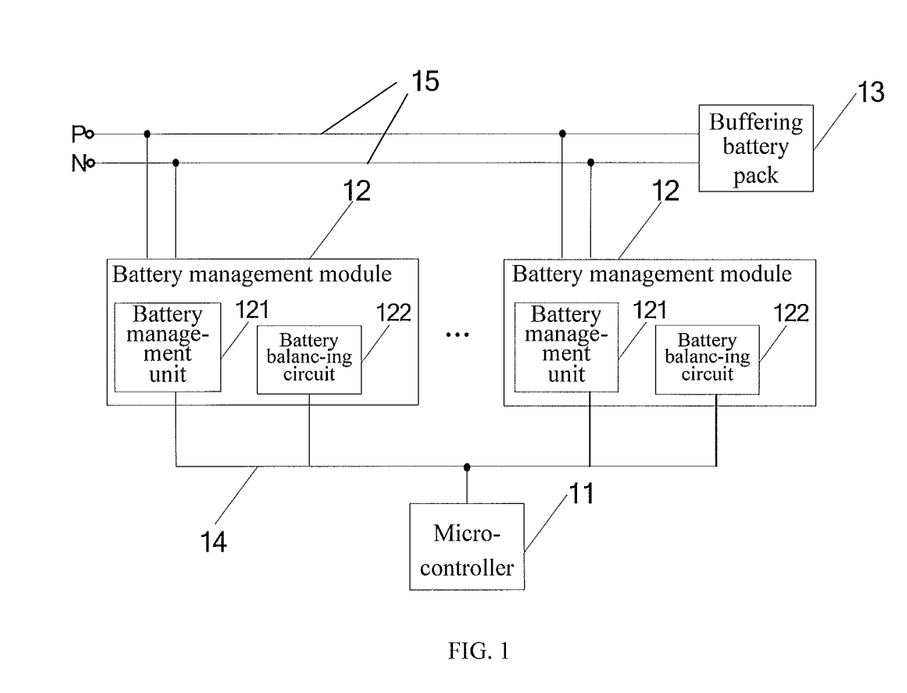
FIG. 1 is a schematic structural view of a battery balancing system of the present disclosure.

FIG. 1 is a schematic structural view of a battery balancing system of the present disclosure. As shown in FIG. 1, the battery balancing system comprises a microcontroller 11, a plurality of battery management modules 12, a buffering battery pack 13, a first bus 14 and a second bus 15.

The microcontroller 11 is connected with the plurality of battery management modules 12 via the first bus 14 respectively. Specifically, the microcontroller 11 is connected with the plurality of battery management modules 12 via a controller area network (CAN) bus respectively. The battery management modules 12 are connected with the buffering battery pack 13 via the second bus 15 respectively. Specifically, the second bus 15 is a power source bus which has a power source positive line P and a power source negative line N, so the battery management modules 12 are connected with the buffering battery pack 13 via the power source positive line P and the power source negative line N.

The battery management modules 12 are adapted to manage individual batteries connected in series. There may be hundreds of individual batteries, and the hundreds of individual batteries connected in series form a battery pack. Specifically, each of the battery management modules 12 comprises a battery management unit 121 and a battery balancing circuit 122. The battery management unit 121 is adapted to provide information about the voltage, the temperature, and the capacity of the individual battery to the microcontroller 11. The battery balancing circuit 122 is adapted to balance the capacities of individual batteries in the battery pack under the control of the microcontroller 11 so that the balanced capacities of the individual batteries in the battery pack are equal to each other.

The microcontroller 11 is adapted to control the battery balancing circuit 122. Specifically, the microcontroller 11 is adapted to control the battery balancing circuit 122 according to the information about the voltage, the temperature, and the capacity of the individual battery acquired from the battery management unit 121. The operation of controlling the battery balancing circuit 122 by the microcontroller 11 is specifically implemented by turning on the battery balancing circuit 122, turning off the battery balancing circuit 122, adjusting the operating time and operating current of the battery balancing circuit 122, and so on.

The buffering battery pack 13 is adapted to buffer the balancing energy of the individual batteries in the battery pack. Specifically, the buffering battery pack 13 is adapted to provide energy to the individual battery with low capacity in the battery pack, or to absorb energy from the individual battery with high capacity in the battery pack. Preferably, a voltage of the buffering battery pack is a 12 V DC voltage.

Specifically, during the charging stage of the battery pack, the microcontroller 11 acquires information about the voltage, the temperature, and the capacity of each individual battery in each of the battery management modules 12 via the first bus 14, and determines whether the capacity of any individual battery in each of the battery management modules 12 exceeds the predetermined threshold according to the aforesaid information. When it is determined by the microcontroller 11 that the capacity of an individual battery exceeds the predetermined threshold, the microcontroller 11 will turn on and control the battery balancing circuit 122 to transfer the energy of the individual battery, of which the capacity exceeds the predetermined threshold, to the buffering battery pack 13 via the second bus 15, i.e., to charge the buffering battery pack 13.

During the discharging stage of the battery pack, the microcontroller 11 acquires information about the voltage, the temperature, and the capacity of each individual battery in each of the battery management modules 12 via the first bus 14, and determines whether the capacity of any individual battery in each of the battery management modules 12 is lower than the predetermined threshold according to the aforesaid information. When it is determined by the microcontroller 11 that the capacity of an individual battery is lower than the predetermined threshold, the microcontroller 11 will turn on and control the battery balancing circuit 122 to obtain energy from the buffering battery pack 13 via the second bus 15 and provide the energy to the individual battery of which the capacity is lower than the predetermined threshold.

During the idle stage of the battery pack (i.e., the battery pack is neither being charged nor discharged), the microcontroller 11 acquires information about the voltage, the temperature, and the capacity of each individual battery in each of the battery management modules 12 via the first bus 14, and turns on and controls the battery balancing circuit 12 to transfer energy of the individual battery, of which the capacity exceeds the predetermined threshold, to the buffering battery pack 13 via the second bus 15 according to the aforesaid information. Moreover, the microcontroller 11 obtains energy from the buffering battery pack 13 via the second bus 15 and provides the energy to the individual battery of which the capacity is lower than the predetermined threshold.

Figure 2:
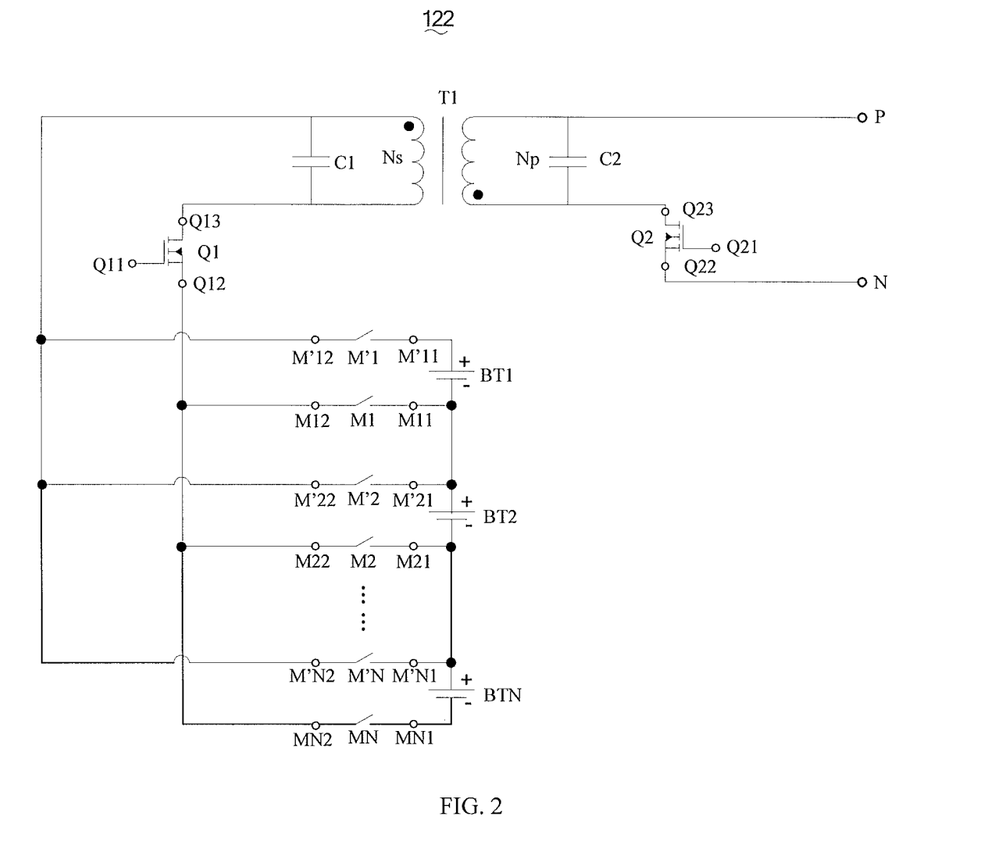
FIG. 2 is a schematic circuit diagram of a first embodiment of a battery balancing circuit shown in FIG. 1.

FIG. 2 is a schematic circuit diagram of a first embodiment of the battery balancing circuit shown in FIG. 1. As shown in FIG. 2, the battery balancing circuit 122 comprises a plurality of individual batteries BTN (N=1, 2 . . . , n), a plurality of first switches MN (N=1, 2 . . . , n), a plurality of second switches M'N (N=1, 2 . . . , n), a first control element Q1, a second control element Q2 and a transformer T1, wherein n is a positive integer.

In this embodiment, each of the first switches MN comprises a first terminal MN1 and a second terminal MN2; each of the second switches comprises a first terminal M'N1 and a second terminal M'N2; the first control element Q1 comprises a first terminal Q11, a second terminal Q12 and a third terminal Q13; the second control element Q2 comprises a first terminal Q21, a second terminal Q22, and a third terminal Q23; and the transformer T1 comprises a primary coil Ns and a secondary coil Np.

The individual batteries BTN are connected in series to form a battery pack. Specifically, taking N=3 as an example, three individual batteries BT1, BT2 and BT3 are included in the battery balancing circuit. The negative pole of the individual battery BT1 is connected with the positive pole of the individual battery BT2, and the negative pole of the individual battery BT2 is connected with the positive pole of the individual battery BT3, so a battery pack including three individual batteries is formed.

An individual battery BTN corresponds to one of the first switches MN paired with one of the second switches M'N. The first terminal MN1 of the first switch MN is connected with the negative pole of the corresponding individual battery BTN, and the second terminal of the first switch MN is connected with the second terminal Q12 of the first control element Q1. The first terminal M'N1 of the second switch M'N is connected with the positive pole of the corresponding individual battery BTN, and the second terminal M'N2 of the second switch M'N is connected with the dotted terminal of the primary coil Ns of the transformer T1.

Further speaking, when three individual batteries BT1, BT2 and BT3 are included in the battery balancing circuit, three first switches M1, M2 and M3 and three second switches M'1, M'2, and M'3 are correspondingly included in the battery balancing circuit. The first switch M1 and the second switch M'1 correspond to the individual battery BT1; the first switch M2 and the second switch M'2 correspond to the individual battery BT2, and the first switch M3 and the second switch M'3 correspond to the individual battery BT3. The first terminal M11 of the first switch M1 is connected with the negative pole of the individual battery BT1, the first terminal M21 of the first switch M2 is connected with the negative pole of the individual battery BT2, and the first terminal M31 of the first switch M3 is connected with the negative pole of the individual battery BT3. The second terminal M12 of the first switch M1, the second terminal M22 of the first switch M2 and the second terminal M32 of the first terminal M3 are connected with each other and are connected to the second terminal Q12 of the first control element Q1. The first terminal M'1 of the second switch M'1 is connected with the positive pole of the individual battery BT1, the first terminal M' 21 of the second switch M'2 is connected with the positive pole of the individual battery BT2, and the first terminal M'31 of the second switch M'3 is connected with the positive pole of the individual battery BT3. The second terminal M'12 of the second switch M'1, the second terminal M'22 of the second switch M'2 and the second terminal M'32 of the second terminal M'3 are connected with each other and are connected to the dotted terminal of the primary coil Ns of the transformer T1.

The first terminal Q11 of the first control element Q1 is adapted to receive a first control signal transmitted by the microcontroller 11 so that the first control element Q1 is selectively turned on between the second terminal Q12 and the third terminal Q13 thereof under the control of the first control signal. The third terminal Q13 of the first control element Q1 is connected with the undotted terminal of the primary coil Ns of the transformer T1, and the first control signal is a pulse signal of which the duty cycles is adjustable.

In this embodiment, the first control element Q1 is an N type MOS transistor, the first terminal Q11 of the first control element Q1 is a gate of the N type MOS transistor, the second terminal Q12 of the first control element Q1 is a source of the N type MOS transistor, and the third terminal Q13 of the first control element Q1 is a drain of the N type MOS transistor. When a high level signal in the pulse signal transmitted by the microcontroller 11 is received by the gate of the N type MOS transistor, the N type MOS transistor is turned on between the source and the drain thereof. In this case, when the first switch MN and the second switch M'N are turned on, the individual battery BTN corresponding to the first switch MN and the second switch M'N is connected with the primary coil Ns of the transformer T1.

Further speaking, when the high level signal in the pulse signal transmitted by the microcontroller 11 is received by the gate of the N type MOS transistor, the individual battery BT1 is connected with the primary coil Ns of the transformer T1 if the first switch M1 and the second switch M'1 are turned on, the individual battery BT2 is connected with the primary coil Ns of the transformer T1 if the first switch M2 and the second switch M'2 are turned on, and the individual battery BT3 is connected with the primary coil Ns of the transformer T1 if the first switch M3 and the second switch M'3 are turned on. As those skilled in the art will understand, a pair of first switch and second switch corresponding to the same individual battery is turned on or turned off simultaneously. Furthermore, during the process of balancing the individual batteries, it is possible that only one individual battery in the battery management modules 12 is balanced at a time, in which case one pair of first switch and second switch in the first switches and the second switches is turned on. Of course, it is also possible that several individual batteries are balanced simultaneously, in which case a plurality of pairs of first switch and second switch in the first switches and the second switches are turned on.

On the contrary, when a low level signal in the pulse signal transmitted by the microcontroller 11 is received by the gate of the N type MOS transistor, the N type MOS transistor is turned off between the source and the drain thereof. In this case, no matter whether the first switch MN and the second switch M'N are turned on or turned off, the individual battery BTN corresponding to the first switch MN and the second switch M'N is disconnected from the primary coil Ns of the transformer T1.

The first terminal Q21 of the second control element Q2 is adapted to receive a second control signal transmitted by the microcontroller 11 so that the second control element Q2 is selectively turned on between the second terminal Q22 and the third terminal Q23 thereof under the control of the second control signal. The third terminal Q23 of the second control element Q2 is connected with the dotted terminal of the secondary coil Np of the transformer T1, and the second terminal Q22 of the second control element Q2 is connected with the power source positive line P of the second bus 15 shown in FIG. 1. Moreover, the undotted terminal of the secondary coil Np of the transformer T1 is connected with the power source negative line N of the second bus 15 shown in FIG. 1. The second terminal Q22 of the second control element Q2 and the undotted terminal of the secondary coil Np of the transformer T1 are adapted to receive energy from an external buffering battery pack 13 for balancing energy of the individual batteries BTN or transfer energy to the buffering battery pack 13. The second control signal is a pulse signal of which the duty cycles is adjustable.

In this embodiment, the second control element Q2 is an N type MOS transistor, the first terminal Q21 of the second control element Q2 is a gate of the N type MOS transistor, the second terminal Q22 of the second control element Q2 is a source of the N type MOS transistor, and the third terminal Q23 of the second control element Q2 is a drain of the N type MOS transistor. When a high level signal in the pulse signal transmitted by the microcontroller 11 is received by the gate of the N type MOS transistor, the N type MOS transistor is turned on between the source and the drain thereof, and in this case, the secondary coil Np of the transformer T1 is connected with the buffering battery pack 13. On the contrary, when a low level signal in the pulse signal transmitted by the microcontroller 11 is received by the gate of the N type MOS transistor, the N type MOS transistor is turned off between the source and the drain thereof, and in this case, the secondary coil Np of the transformer T1 is disconnected from the buffering battery pack 13.

Preferably, the battery balancing circuit 122 further comprises a first capacitor C1 and a second capacitor C2. The first capacitor C1 is connected in parallel between the dotted terminal and the undotted terminal of the primary coil Ns of the transformer T1, and the second capacitor C2 is connected in parallel between the dotted terminal and the undotted terminal of the secondary coil Np of the transformer T1. The first capacitor C1 and the second capacitor C2 are adapted to filter high frequency harmonic.

Further speaking, it is assumed that in the battery balancing circuit, the capacity of the individual battery BT1 is higher than the predetermined threshold, and the capacity of the individual battery BT2 is lower than the predetermined threshold. Then, how the battery balancing circuit 122 works is as follows:

When the capacity of the individual battery BT1 is higher than the predetermined threshold, the microcontroller 11 firstly controls the first switch M1 and the second switch M'1 to be turned on, then inputs pulse signals of which the duty cycles are adjustable into the gate of the first control element Q1 and the gate of the second control element Q2 such that the capacity of the individual battery BT1 is reduced to the predetermined threshold, and finally controls the first switch M1 and the second switch M'1 to be turned off.

Specifically, firstly the microcontroller 11 controls the second control element Q2 to be turned off, i.e., controls the low level signal to be input into the gate of the second control element Q2 while controlling the first control element Q1 to be turned on, i.e., controlling the high level signal to be input into the gate of the first control element Q1, and in this case, the energy of the individual battery BT1 is stored into a magnetic core of the transformer T1 via the primary coil Ns of the transformer T1. Next, the microcontroller 11 controls the second control element Q2 to be turned on, i.e., controls the high level signal to be input into the gate of the second control element Q2 while controlling the first control element Q1 to be turned off, i.e., controlling the low level signal to be input into the gate of the first control element Q1, and in this case, the energy stored into the magnetic core of the transformer T1 is transferred to the buffering battery pack 13 via the secondary coil of the transformer T1 to charge the buffering battery pack 13. Then, the microcontroller 11 controls the first control element Q1 to be turned on or turned off alternatively and, correspondingly, controls the second control element Q2 to be turned off or turned on alternatively until the energy of the individual battery BT1 reaches the predetermined threshold.

When the capacity of the individual battery BT2 is lower than the predetermined threshold, the microcontroller 11 firstly controls the first switch M2 and the second switch M'2 to be turned on, then inputs pulse signals of which the duty cycles are adjustable into the gate of the first control element Q1 and the gate of the second control element Q2 such that the capacity of the individual battery BT2 is increased to the predetermined threshold, and finally controls the first switch M2 and the second switch M'2 to be turned off.

Specifically, firstly the microcontroller 11 controls the first control element Q1 to be turned off, i.e., controls the low level signal to be input into the gate of the first control element Q1 while controlling the second control element Q2 to be turned on, i.e., controlling the high level signal to be input into the gate of the second control element Q2, and in this case, the energy of the buffering battery pack 13 is stored into the magnetic core of the transformer T1 via the secondary coil Np of the transformer T1 through the second bus 15. Next, the microcontroller 11 controls the first control element Q1 to be turned on, i.e., controls the high level signal to be input into the gate of the first control element Q1 while controlling the second control element Q2 to be turned off, i.e., controlling the low level signal to be input into the gate of the second control element Q2, and in this case, the energy stored into the magnetic core of the transformer T1 is transferred to the individual battery BT2 via the primary coil Ns of the transformer T1 to charge the individual battery BT2. Then, the microcontroller 11 controls the second control element Q2 to be turned on or turned off alternatively and, correspondingly, controls the first control element Q1 to be turned off or turned on alternatively until the energy of the individual battery BT2 is increased to the predetermined threshold.

Figure 3:
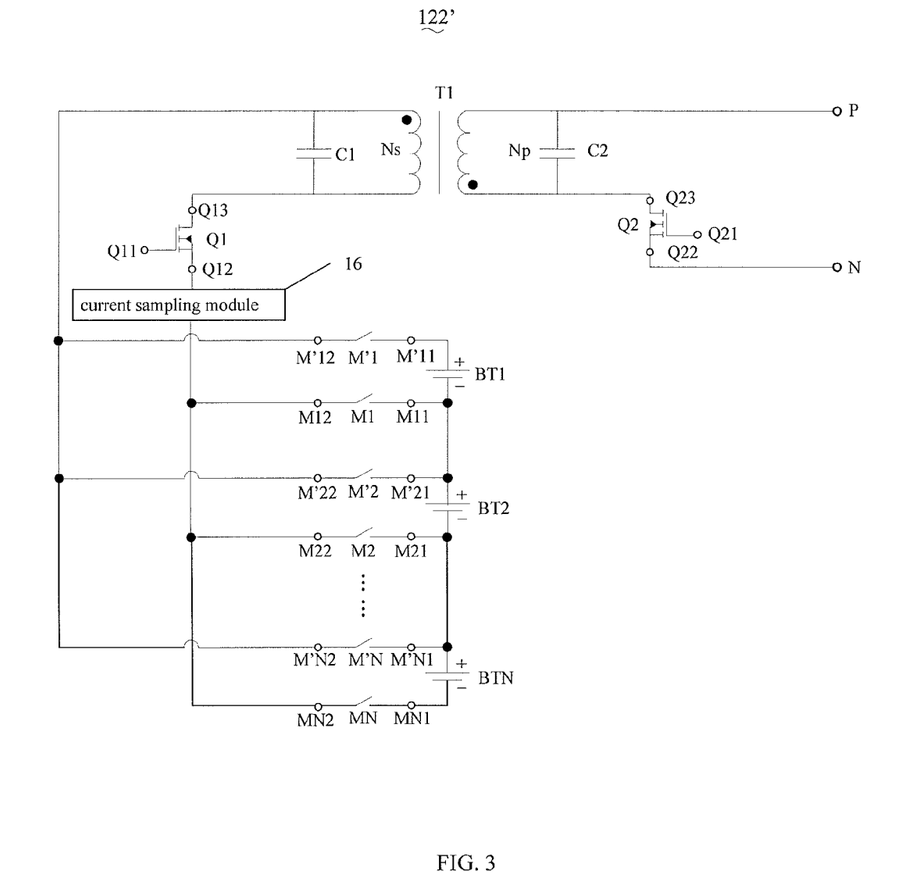
FIG. 3 is a schematic circuit diagram of a second embodiment of the battery balancing circuit shown in FIG. 1.

FIG. 3 is a schematic circuit diagram of a second embodiment of the battery balancing circuit shown in FIG. 1. Modules shown in FIG. 3 that have the same reference numerals as those of FIG. 2 have the same structures and the same functions, so they will not be further described herein. The battery balancing circuit 122' of FIG. 3 mainly differs from the battery balancing circuit 122 of FIG. 2 in that:

The battery balancing circuit 122' further comprises a current sampling module 16.

The current sampling module 16 is connected in series between the second terminal Q12 of the first control element Q1 and the second terminal MN2 of the first switch element MN to acquire a balancing current from the battery balancing circuit 122' and transfer the balancing current to the microcontroller 11. The microcontroller 11 adjusts the duty cycles of the first control signal and the second control signal according to the acquired balancing current to maintain the balancing current at a constant value. When the capacity of the individual battery is higher than the predetermined threshold, the balancing current is a constant discharging current; and when the capacity of the individual battery is lower than the predetermined threshold, the balancing current is a constant charging current.

Figure 4:
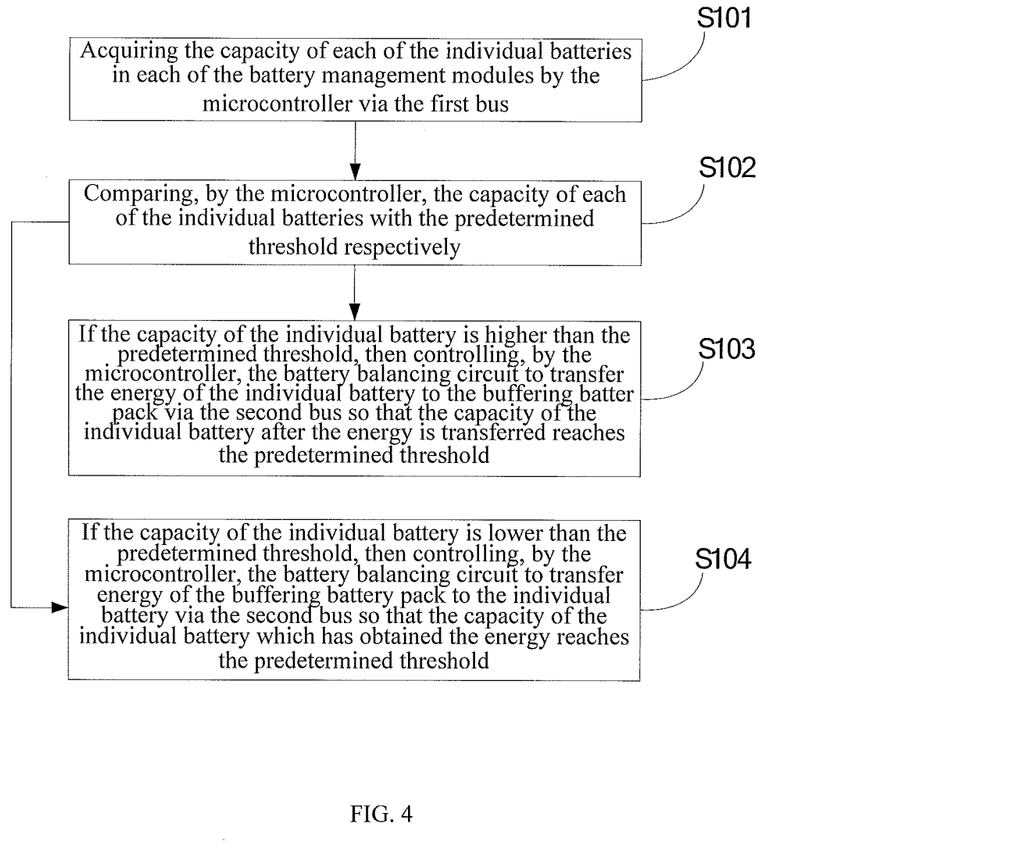
FIG. 4 is a flowchart diagram of a battery balancing method of the present disclosure.

FIG. 4 is a flowchart diagram of a battery balancing method according to the embodiments of the present disclosure. For example, the method in FIG. 4 may be implemented by the battery balancing system shown in FIG. 1. It shall be noted that, the method of the present disclosure is not limited to the process flow order shown in FIG. 4 if substantially same result can be achieved. As shown in FIG. 4, the method comprises the following steps.

Step S101: acquiring the capacity of each of the individual batteries in each of the battery management modules by the microcontroller via the first bus;

In the step S101, a plurality of individual batteries is connected in series to form a battery pack. A plurality of battery management modules is used to manage the individual batteries connected in series. Preferably, one battery management module manages at most 12 individual batteries connected in series.

The first bus is preferably a CAN bus, and the microcontroller acquires the capacity of each of the individual batteries in each of the battery management modules via the CAN bus in real time.

Step S102: comparing, by the microcontroller, the capacity of each of the individual batteries with the predetermined threshold respectively;

In the step S102, the microcontroller compares the capacity of each of the individual batteries in each of the battery management modules with the predetermined threshold. When the capacity of the individual battery is higher than the predetermined threshold, the individual battery is discharged to lower the capacity of the individual battery. When the capacity of the individual battery is lower than the predetermined threshold, the individual battery is charged to increase the capacity of the individual battery. When the capacity of the individual battery is close to the predetermined threshold, no operation is performed.

Step S103: if the capacity of the individual battery is higher than the predetermined threshold, then controlling, by the microcontroller, the battery balancing circuit to transfer the energy of the individual battery to the buffering batter pack via the second bus so that the capacity of the individual battery after the energy is transferred reaches the predetermined threshold;

In the step S103, the step of controlling, by the microcontroller, the battery balancing circuit to transfer the energy of the individual battery to the buffering batter pack via the second bus is specifically implemented by: firstly controlling, by the microcontroller, the first switch and the second switch corresponding to the individual battery to be turned on; then controlling, by the microcontroller, the individual battery to be connected with the primary coil of the transformer via the first control signal and, meanwhile, controlling the buffering battery pack to be disconnected from the secondary coil via the second control signal so that the energy of the individual battery is stored into the magnetic core of the transformer via the primary coil. Specifically, the microcontroller controls the first control signal to output a high level signal to turn on the first control element so that the individual battery is connected with the primary coil of the transformer. Meanwhile, the microcontroller controls the second control signal to output a low level signal to turn off the second control element so that the buffering battery pack is disconnected from the secondary coil. Next, the microcontroller controls the individual battery to be disconnected from the primary coil via the first control signal and, meanwhile, controls the buffering battery pack to be connected with the secondary coil via the second control signal so that the energy stored into the magnetic core is transferred to the buffering battery pack via the secondary coil and the second bus in sequence. Specifically, the microcontroller controls the first control signal to output a low level signal to turn off the first control element so that the individual battery is disconnected from the primary coil of the transformer. Meanwhile, the microcontroller controls the second control signal to output a high level signal to turn on the second control element so that the buffering battery pack is connected with the secondary coil. The second bus is a power source bus. Next, the microcontroller controls the first control element to be turned on or turned off alternatively and, correspondingly, controls the second control element to be turned off or turned on alternatively so that the energy of the individual battery is transferred to the buffering battery pack via the power source bus until the energy of the individual battery is reduced to the predetermined threshold. Finally, the microcontroller controls the first switch and the second switch corresponding to the individual battery to be turned off.

Step S104: if the capacity of the individual battery is lower than the predetermined threshold, then controlling, by the microcontroller, the battery balancing circuit to transfer energy of the buffering battery pack to the individual battery via the second bus so that the capacity of the individual battery which has obtained the energy reaches the predetermined threshold.

In the step S104, the step of controlling, by the microcontroller, the battery balancing circuit to transfer energy of the buffering battery pack to the individual battery via the second bus is specifically implemented by: firstly controlling, by the microcontroller, the first switch and the second switch corresponding to the individual battery to be turned on; then controlling, by the microcontroller, the buffering battery pack to be connected with the secondary coil via the second control signal and, meanwhile, controlling the individual battery to be disconnected from the primary coil via the first control signal so that the energy of the buffering battery pack is stored into the magnetic core of the transformer via the second bus and the secondary coil in sequence. Specifically, the microcontroller controls the second control signal to output a high level signal to turn on the second control element so that the buffering battery pack is connected with the secondary coil. Meanwhile, the microcontroller controls the first control signal to output a low level signal to turn off the first control element so that the individual battery is disconnected from the primary coil of the transformer. Next, the microcontroller controls the buffering battery pack to be disconnected from the secondary coil via the second control signal and, meanwhile, controlling the individual battery to be connected with the primary coil via the first control signal so that the energy stored into the magnetic core is transferred to the individual battery via the primary coil. Specifically, the microcontroller controls the second control signal to output a low level signal to turn off the second control element so that the buffering battery pack is disconnected from the secondary coil. Meanwhile, the microcontroller controls the first control signal to output a high level signal to turn on the first control element so that the individual battery is connected with the primary coil of the transformer. Then, the microcontroller controls the second control element to be turned on or turned off alternatively and, correspondingly, controls the first control element to be turned off or turned on alternatively so that the individual battery absorbs energy from the buffering battery pack until the energy of the individual battery is increased to the predetermined threshold. Finally, the microcontroller controls the first switch and the second switch corresponding to the individual battery to be turned off.

The benefits of the present disclosure are as follows: as compared with the prior art, the battery balancing circuit, system and method of the present disclosure control the first control element and the second control element to be selectively turned on so that when the energy in the individual battery is excessive, the excessive energy is transferred to the buffering battery pack; and when the energy in the individual battery is insufficient, the individual battery absorbs energy from the buffering battery pack. In this way, the balance among individual batteries in the battery pack is accomplished with a relatively simple circuit and the service life of the battery pack is prolonged. Meanwhile, the present disclosure solves the problem that the prior art can only achieve the balance among individual batteries managed by a single battery management module but cannot achieve the balance among all the individual batteries of the whole battery pack.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A battery balancing system, comprising a microcontroller, a plurality of battery management modules and a buffering battery pack, wherein the battery management modules each comprise a battery balancing circuit, the microcontroller connects with the plurality of battery management modules respectively via a first bus, and the plurality of battery management modules connect with the buffering battery pack respectively via a second bus, the battery balancing circuit comprises:
    a plurality of individual batteries connected in series to form a battery pack;
    a plurality of first switches and a plurality of second switches, wherein each of the individual batteries corresponds to one of the first switches paired with one of the second switches, and each of the first switches has a first terminal connected to a negative pole of the corresponding individual battery and each of the second switches has a first terminal connected to a positive pole of the corresponding individual battery;
    a first control element, having a first terminal adapted to receive a first control signal transmitted by the microcontroller so that the first control element is selectively turned on between a second terminal and a third terminal thereof under the control of the first control signal, and the second terminal of the first control element is connected with a second terminal of each of the first switches;
    a second control element, having a first terminal adapted to receive a second control signal transmitted by the microcontroller so that the second control element is selectively turned on between a second terminal and a third terminal thereof under the control of the second control signal; and
    a transformer, comprising a primary coil and a secondary coil, wherein a dotted terminal of the primary coil is connected with the second terminal of each of the second switches, an undotted terminal of the primary coil is connected with the third terminal of the first control element, a dotted terminal of the secondary coil is connected with the third terminal of the second control element, and an undotted terminal of the secondary coil and the second terminal of the second control element are adapted to receive energy from an external buffering battery pack for balancing energy of each of the individual batteries or transfer energy to the buffering battery pack.

2. The system of claim 1, wherein the first bus is a controller local area network (LAN) bus, and the second bus is a power source bus.

3. The system of claim 1, wherein the first control element is an N type metal oxide semiconductor (MOS) transistor, and the first terminal, the second terminal and the third terminal of the first control element are a gate, a source and a drain of the N type MOS transistor; and the second control element is an N type MOS transistor, and the first terminal, the second terminal and the third terminal of the second control element are a gate, a source and a drain of the N type MOS transistor.

4. The system of claim 1, wherein a voltage of the buffering battery pack is a 12 V DC voltage.

5. The system of claim 3, wherein the first control signal and the second control signal are pulse signals of which the duty cycles are adjustable.

6. The system of claim 1, wherein the battery balancing circuit further comprising a current sampling module, wherein the current sampling module is connected in series between the second terminal of the first control element and the second terminal of each of the first switches to acquire a balancing current from the battery balancing circuit and transfer the balancing current to the microcontroller so that the microcontroller adjusts the first control signal and the second control signal according to the balancing current.

7. A battery balancing method based on a battery balancing system of claim 1, the method comprising:
acquiring the capacity of each of the individual batteries in each of the battery management modules by the microcontroller via the first bus;
comparing, by the microcontroller, the capacity of each of the individual batteries with a predetermined threshold respectively;
if the capacity of any of the individual batteries is higher than the predetermined threshold, then controlling, by the microcontroller, the battery balancing circuit to transfer the energy of the individual battery of which the capacity is higher than the predetermined threshold to the buffering batter pack via the second bus so that the capacity of the individual battery after the energy is transferred reaches the predetermined threshold; and
if the capacity of any of the individual batteries is lower than the predetermined threshold, then controlling, by the microcontroller, the battery balancing circuit to transfer energy of the buffering battery pack to the individual battery of which the capacity is lower than the predetermined threshold via the second bus so that the capacity of the individual battery which has obtained the energy reaches the predetermined threshold.

8. The method of claim 7, wherein the step of controlling, by the microcontroller, the battery balancing circuit to transfer the energy of the individual battery of which the capacity is higher than the predetermined threshold to the buffering batter pack via the second bus is specifically implemented by:
controlling, by the microcontroller, the first switch and the second switch corresponding to the individual battery of which the capacity is higher than the predetermined threshold to be turned on;
controlling, by the microcontroller, the individual battery of which the capacity is higher than predetermined threshold to be connected with the primary coil via the first control signal and, meanwhile, controlling the buffering battery pack to be disconnected from the secondary coil via the second control signal so that the energy of the individual battery of which the capacity is higher than the predetermined threshold is stored into a magnetic core of the transformer via the primary coil; and
controlling, by the microcontroller, the individual battery of which the energy is stored into a magnetic core of the transformer to be disconnected from the primary coil via the first control signal and, meanwhile, controlling the buffering battery pack to be connected with the secondary coil via the second control signal so that the energy stored into the magnetic core is transferred to the buffering battery pack via the secondary coil and the second bus in sequence.

9. The method of claim 8, wherein the step of controlling, by the microcontroller, the battery balancing circuit to transfer energy of the buffering battery pack to the individual battery of which the capacity is lower than the predetermined threshold via the second bus is specifically implemented by:
controlling, by the microcontroller, the first switch and the second switch corresponding to the individual battery of which the capacity is lower than the predetermined threshold to be turned on;
controlling, by the microcontroller, the buffering battery pack to be connected with the secondary coil via the second control signal and, meanwhile, controlling the individual battery of which the capacity is lower than the predetermined threshold to be disconnected from the primary coil via the first control signal so that the energy of the buffering battery pack is stored into the magnetic core of the transformer via the second bus and the secondary coil in sequence; and
controlling, by the microcontroller, the buffering battery pack to be disconnected from the secondary coil via the second control signal and, meanwhile, controlling the individual battery of which the capacity is lower than the predetermined threshold to be connected with the primary coil via the first control signal so that the energy stored into the magnetic core is transferred to the individual battery of which the capacity is lower than the predetermined threshold via the primary coil.

10. The method of claim 7, wherein the first bus is a controller local area network (LAN) bus, and the second bus is a power source bus.

11. The method of claim 7, wherein the first control element is an N type metal oxide semiconductor (MOS) transistor, and the first terminal, the second terminal and the third terminal of the first control element are a gate, a source and a drain of the N type MOS transistor; and the second control element is an N type MOS transistor, and the first terminal, the second terminal and the third terminal of the second control element are a gate, a source and a drain of the N type MOS transistor.

12. The method of claim 7, wherein a voltage of the buffering battery pack is a 12 V DC voltage.

13. The method of claim 7, wherein the first control signal and the second control signal are pulse signals of which the duty cycles are adjustable.

14. The method of claim 7, wherein the battery balancing circuit further comprising a current sampling module, wherein the current sampling module is connected in series between the second terminal of the first control element and the second terminal of each of the first switches to acquire a balancing current from the battery balancing circuit and transfer the balancing current to the microcontroller so that the microcontroller adjusts the first control signal and the second control signal according to the balancing current.

15. The system of claim 1, wherein the first control element is an N type metal oxide semiconductor (MOS) transistor, and the first terminal, the second terminal and the third terminal of the first control element are a gate, a source and a drain of the N type MOS transistor; and the second control element is an N type MOS transistor, and the first terminal, the second terminal and the third terminal of the second control element are a gate, a source and a drain of the N type MOS transistor.

16. The system of claim 1, wherein a voltage of the buffering battery pack is a 12 V DC voltage.

17. The system of claim 1, wherein the first control signal and the second control signal are pulse signals of which the duty cycles are adjustable.

* * * * *